(12) United States Patent
Saado et al.

(10) Patent No.: US 7,340,667 B2
(45) Date of Patent: Mar. 4, 2008

(54) METHOD AND/OR APPARATUS IMPLEMENTED IN HARDWARE TO DISCARD BAD LOGICAL TRANSMISSION UNITS (LTUS)

(75) Inventors: Alon Saado, San Diego, CA (US); Muhammad Afsar, San Diego, CA (US)

(73) Assignee: VIA Telecom Co., Ltd., San Diego, CA (US)

( * ) Notice: Subject to any disclaimer, the term of this patent is extended or adjusted under 35 U.S.C. 154(b) by 613 days.

(21) Appl. No.: 10/842,376

(22) Filed: May 10, 2004

(65) Prior Publication Data
US 2005/0251717 A1 Nov. 10, 2005

(51) Int. Cl.
*H03M 13/00* (2006.01)
(52) U.S. Cl. .................. 714/776; 714/758; 714/755; 714/756
(58) Field of Classification Search ............... 714/776, 714/758, 755, 756
See application file for complete search history.

(56) References Cited

U.S. PATENT DOCUMENTS

| | | | | |
|---|---|---|---|---|
| 4,922,488 A | * | 5/1990 | Niestegge | 370/413 |
| 4,970,714 A | * | 11/1990 | Chen et al. | 370/216 |
| 5,511,166 A | * | 4/1996 | Travaglio et al. | 709/250 |
| 6,259,684 B1 | * | 7/2001 | Fong et al. | 370/328 |
| 6,609,225 B1 | | 8/2003 | Ng | 714/781 |
| 6,782,059 B2 | * | 8/2004 | Lin | 375/340 |
| 7,159,164 B1 | * | 1/2007 | Saifuddin et al. | 715/755 |

OTHER PUBLICATIONS

Terabyte Triangle, http://www.terabytetriangle.com/index.php/id=7 &sub=2, no date.*
Stephen B. Wicker, Error Control Systems for Digital Communications and Storage, Prentice-Hall, 1995, pp. 116-121.*
In The Zone Communications Company, http://www.satphonezone.com/cdmatechnology.html, no date.*

* cited by examiner

*Primary Examiner*—Joseph D. Torres
(74) *Attorney, Agent, or Firm*—Christopher P. Maiorana, PC

(57) ABSTRACT

The present invention concerns an apparatus comprising a logic circuit, a compare circuit, a control circuit and a memory interface. The logic circuit may be configured to generate a check signal in response to (i) a data signal having a series of logical transmission units (LTUs) and (ii) a first control signal. The compare circuit may be configured to generate a compare signal in response to the check signal and the data signal. The control circuit configured to generate (i) the first control signal and (ii) a second control signal indicating a valid or invalid status of each of the LTUs, in response to a data valid signal and the compare signal. The memory interface may be configured to generate an output data signal in response to the second control signal. The memory interface is generally configured to store only the LTUs having a valid status.

15 Claims, 4 Drawing Sheets

METHOD AND/OR APPARATUS IMPLEMENTED IN HARDWARE TO DISCARD BAD LOGICAL TRANSMISSION UNITS (LTUS)

FIELD OF THE INVENTION

The present invention relates to data transmission generally and, more particularly, to a method and/or architecture implemented in hardware configured to discard bad logical transmission units (LTUs).

BACKGROUND OF THE INVENTION

A CDMA communication system uses Service Data Unit (SDU) frames to transmit and receive data. SDUs may use the Physical Layer Supplemental Channel (SCH) for transmission of data. An SDU frame may include a payload and a frame CRC (cyclical redundancy check) field. The frame CRC is used to detect errors in the payload. When using convolutional code, the multiplex sublayer may use Logical Transmission Units (LTUs) to assemble SCH SDUs. Each LTU includes a payload and a LTU CRC field. The LTU CRC field is used to detect errors in the LTU payload.

Referring to FIG. 1, a SCH SDU frame 10 is shown. The SDU frame 10 includes a number of LTUs 12a-12n and a frame CRC 14. Conventional systems use logic (normally part of a decoder) to compute the frame CRC for comparison to a received frame CRC. The decoder usually contains a sub-module that computes the frame CRC and normally supplies a signal that indicates a CRC passed/failed condition. Such a comparison gives an indication if the frame payload is valid or not valid. If the CRC comparison failed, the application may discard the whole frame and not process the frame.

Another conventional approach is to compute the LTU CRC using software. With such an apparatus, the LTU is discarded if there is not a match between the CRC fields. The software processes the LTU data if there is a match. A single invalid LTU 12a-12n causes the entire frame to have an invalid CRC field 14. A frame of data with an unmatched frame CRC field may still include one or more valid LTUs 12a-12n. Computing the LTU CRCs 16a-16n by a CPU consumes MIPS, and delays the processing of the LTU data until the CRC fields are compared.

It would be desirable to check the individual LTUs within a frame before discarding the frame to see if any of the LTUs are valid and may be used. It would also be desirable to check the LTU CRCs using hardware to discard invalid LTUs to reduce load placed on the processing software.

SUMMARY OF THE INVENTION

The present invention concerns an apparatus comprising a logic circuit, a compare circuit, a control circuit and a memory interface. The logic circuit may be configured to generate a check signal in response to (i) a data signal having a series of logical transmission units (LTUs) and (ii) a first control signal. The compare circuit may be configured to generate a compare signal in response to the check signal and the data signal. The control circuit configured to generate (i) the first control signal and (ii) a second control signal indicating a valid or invalid status of each of the LTUs, in response to a data valid signal and the compare signal. The memory interface may be configured to generate an output data signal in response to the second control signal. The memory interface is generally configured to store only the LTUs having a valid status.

The objects, features and advantages of the present invention include providing a method and/or apparatus for discarding bad logical transmission units that may (i) be implemented in hardware, (ii) discard only invalid LTUs, while processing the payload (either processed or unprocessed) of valid LTUs, (iii) eliminate the need to calculate a CRC with software, (iv) reduce the MIPS needed to compute LTU CRC fields, and/or (v) start processing payloads earlier than conventional approaches.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 2:
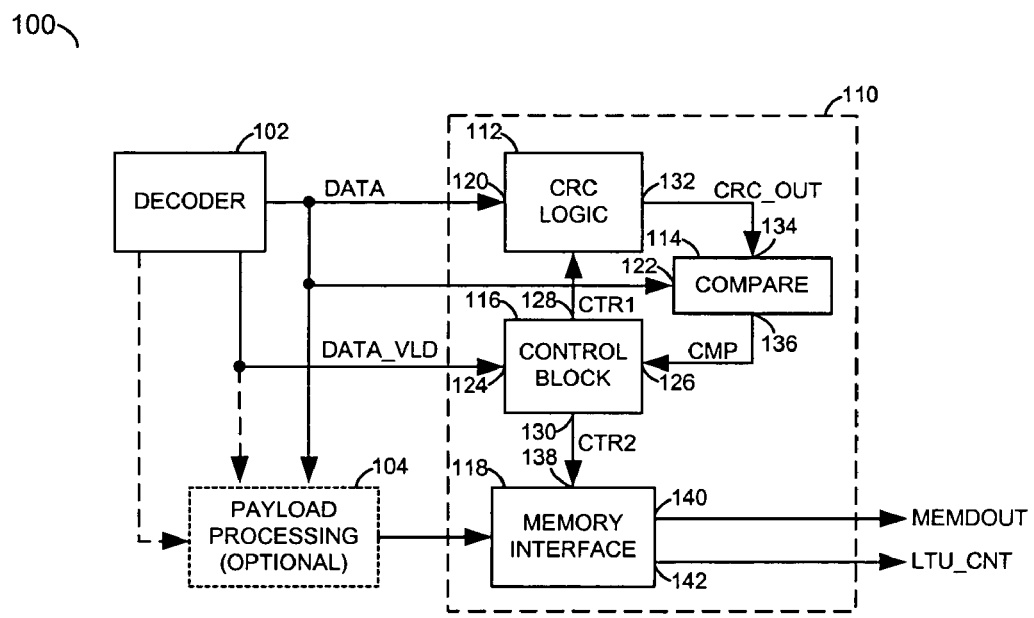
FIG. 2 is a block diagram of a preferred embodiment of the present invention.

Referring to FIG. 2, a block diagram of a system 100 is shown in illustrating a context for a preferred embodiment of the present invention. The system 100 generally comprises a decoder 102, an optional payload processing block 104, and a circuit 110. The circuit 110 generally implements the present invention. However, the circuit 110, in combination with the other components of the system 100, may be considered aspects of the present invention. The payload processing block 104 may provide processing in accordance with one of a number of predefined standards.

The circuit 110 generally comprises a block (or circuit) 112, a block (or circuit) 114, a block (or circuit) 116, and a block (or circuit) 118. The circuit 112 may be implemented as a CRC logic circuit. The circuit 114 may be implemented as a compare circuit. The circuit 116 may be implemented as a control circuit. The circuit 118 may be implemented as a memory interface circuit. The circuit 112 may have an input 120 that may receive a signal (e.g., DATA).

Figure 1:
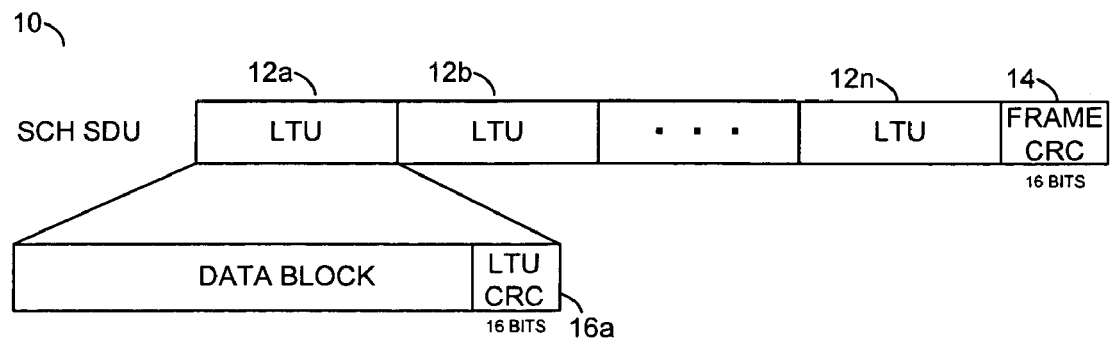
FIG. 1 illustrates an SCH SDU frame.

The signal DATA represents a series of data words received from the decoder 102. The data words may be SCH SDU data words as described in connection with FIG. 1. The circuit 114 may have an input 122 that may also receive the signal DATA. The circuit 116 may have an input 124 that may receive a signal (e.g., DATA_VLD) from the decoder 102. The control block 116 may also have an input 126 that may receive a signal (e.g., CMP) from the compare circuit 114. The control block 116 may generate a control signal (e.g., CTR1) and a control signal (e.g., CTR2) in response to the signal DATA_VLD and the signal CMP. The control signal CTR2 may be a multi-bit control signal representing a number of individual control signals. The control signal CTR1 may be presented to an output 128. The control signal CTR2 may be presented to an output 130. The logic circuit 112 may generate a signal (e.g., CRC_OUT) in response to signal DATA and the signal CTR1. The signal CRC_OUT may be a check signal presented from an output 132 to an input 134. The compare circuit 114 generates the signal CMP in response to the signal DATA and the signal CRC_OUT. The signal CMP may be presented from an output 136. The memory interface 118 may have an input 138 that receives the signal CTR2. The memory interface 118 may present a signal (e.g., MEMDOUT) from an output 140 and a signal (e.g., LTU_CNT) from an output 142. The signal MEMOUT generally represents the data out of the memory interface 118. The signal LTU_CNT generally represents a count signal indicating how many LTUs are stored in the memory interface 118.

A CRC field at the end of a frame is normally used to detect errors in a payload. The CRC field is normally generated on a per frame basis. A frame of data may include a payload and a frame CRC. The frame may be assembled using a plurality of Logical Transmission Units (LTUs). Each LTU includes a payload and a LTU CRC field. The LTU CRC field may be used to detect errors in the LTU payload. Normally, a receiver contains logic to compute the frame CRC field of the frame payload. A mismatch between a computed frame CRC field and a received frame CRC field indicates errors in the frame payload.

The present invention may be useful in the case where the computed frame CRC field does not match the received frame CRC field, but one or more computed LTU CRC fields do match the received LTU CRC fields. When particular payloads do not have errors (e.g., a valid payload), the valid payloads may be used. By discarding only bad LTUs (and using the payload of the valid LTUs), the overall MIPS used may be reduced. Furthermore, the processing of the valid payloads may start earlier since only the valid LTUs are saved (e.g., there is no need to compute the LTU CRC by the software).

New words supplied by the decoder 102 are generally processed by the CRC logic 112. At the end of the LTU, the calculated LTU CRC is normally presented from the CRC logic 112 as the signal CRC_OUT. The comparator 114 compares the calculated LTU CRC and a received LTU CRC (e.g., within the signal DATA) supplied by the decoder 102. The comparator 114 presents the signal CMP as an indication whether the words match or not. The control block 116 supplies the control signals CTR1 and CTR2 to the CRC logic 112 and the memory interface 118, respectively. A particular LTU is saved or discarded in response to the signal CMP.

The memory interface 118 includes a memory configured to store the LTU payloads (to be described in more detail in connection with FIG. 4). The LTU payload may be processed prior to being written to the memory or saved without processing. The first address of each saved LTU is kept in a register, and can be stored in case of a bad LTU. At the end of a frame, the memory contains only the good LTU payloads. The memory interface 118 presents LTUs that are saved in the memory for use by the next level (hardware or software).

Figure 3:
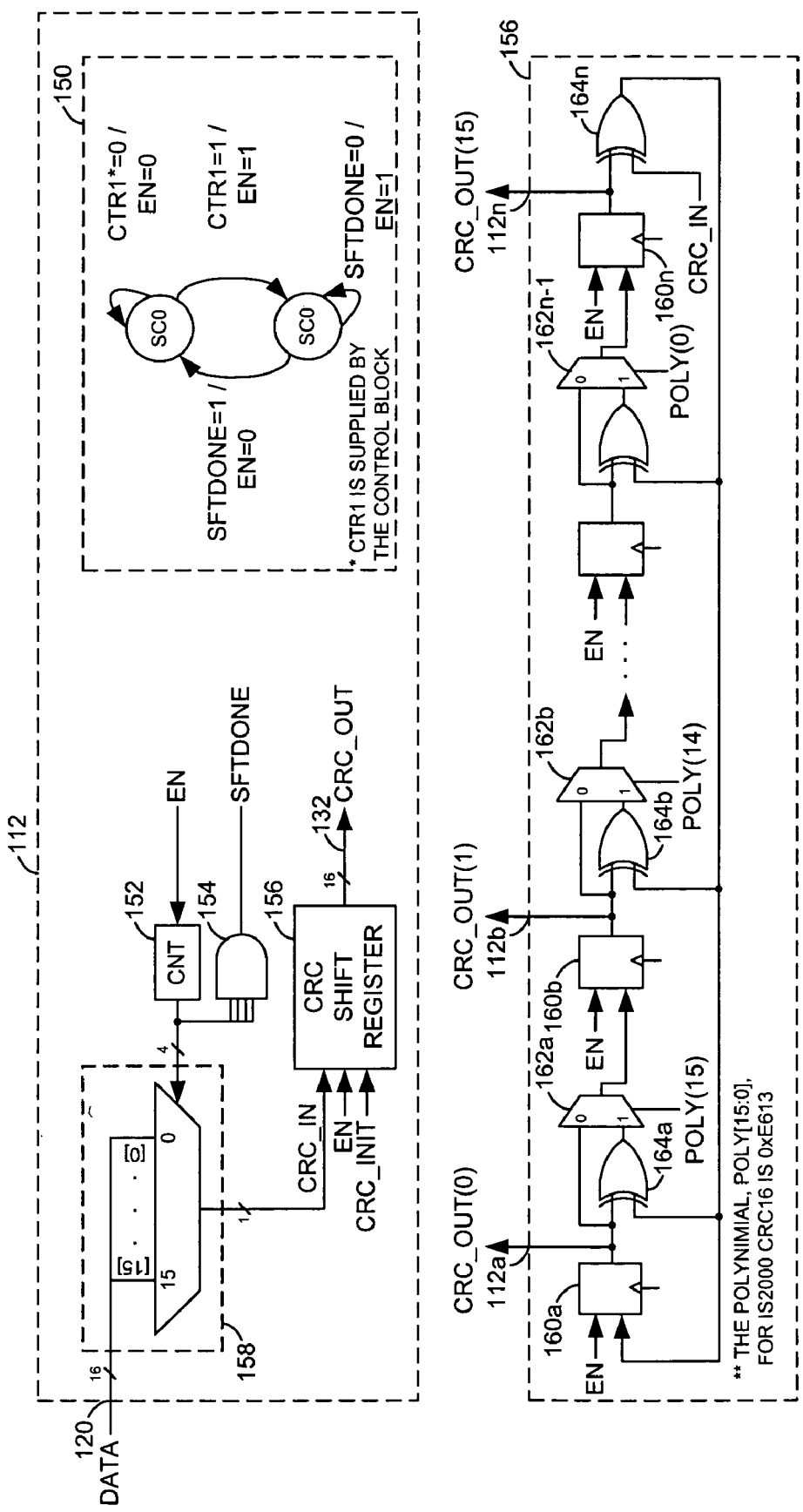
FIG. 3 is a diagram of the CRC logic of FIG. 2.

Referring to FIG. 3, a diagram of the CRC logic 112 is shown. The CRC logic calculates the CRC field of a particular payload. In one example, a 16-bit CRC is described. However, other CRC sizes may be implemented to meet the design criteria of a particular implementation. Additionally, various methods to calculate the LTU CRC may be implemented.

The CRC logic 112 generally comprises a state machine 150, a counter 152, a gate 154, a register 156, and an input section (or circuit) 158. The gate 154 may be implemented as an AND gate. The register 156 may be implemented as a CRC shift register. The CRC shift register 156 generally comprises one or more sequential elements 160a-160n, one or more multiplexers 162a-162n-1 and one or more gates 164a-164n. The gates 164a-164n are shown implemented as XOR gates. However, other types of gates, or gate combinations, may be implemented to meet the design criteria of a particular implementation. Individual bits of a polynimial (e.g., [15:0]) are shown presented to the control inputs of the various gates 162a-162n-1 as the signals POLY(15), POLY(14), POLY(0), etc. The polynimial [15:0] is normally a predetermined 16-bit constant (using the 16-bit example).

At the beginning of each LTU, the shift register 156 is set to a known value by asserting a signal (e.g., CRC_INIT). When a new word is supplied by the decoder 102, a CRC state machine 150 is triggered. The state machine 150 enables the counter 152 and the shift register 156 by asserting an enable signal (e.g., EN). Each new word is shifted through the CRC shift register 156. A four bit counter may be used to count up to 16 shifts (or cycles) After 16 cycles, the counter 152 and the shift register 156 are disabled by de-asserting the signal EN. After all of the payload words are shifted through the CRC logic 112, the CRC shift register 156 presents the computed LTU CRC data as the signal CRC_OUT. The gate 154 generally asserts a signal (e.g., SFTDONE) when the last bit was a shift. While an AND gate is shown, other gates may be implemented to meet the design criteria of a particular implementation.

Figure 4:
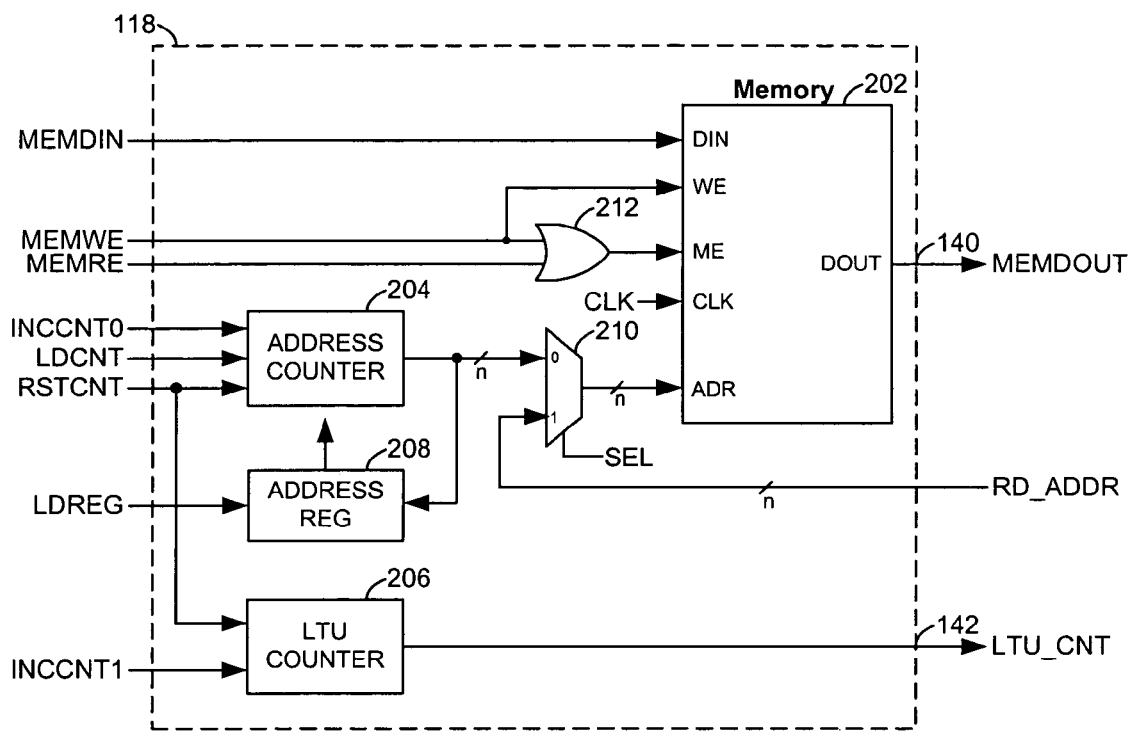
FIG. 4 is a diagram of the memory interface of FIG. 2.

Referring to FIG. 4, a diagram of the memory interface 118 is shown. The memory interface 118 generally comprises a memory 202, a counter 204, a counter 206, a register 208, a multiplexer 210 and a gate 212. Additional gates may be included for the various ports of the memory 202. The gate 212 may be used to enable the memory 202 if either a write enable signal (e.g., MEMWE) or a read enable signal (e.g., MEMRE) is asserted. In the implementation shown, a synchronous single port memory is implemented. However, different types of memories may be implemented to meet the design criteria of a particular implementation. In general, the size of the memory 202 should be sufficient to hold a payload of the largest frame supported. However, other sizes and configurations may be considered. For example, implementing the memory 202 with two banks, where each bank is large enough to hold the largest LTU payload supported, may be used. In such an implementation, while one bank is read, the other may be written, increasing the overall speed of the system 100. The various signals shown being received by the memory interface 118 (e.g., MEMDIN, MEMWE, MEMRE, INCCNT0, LDCNT, RSTCNT, LDREG, INCCNT1, and RD_ADDR) are represented generally in FIG. 2 as the control signal CTR2. Details of the various signals are described in connection with FIG. 5 and throughout the specification.

When a new LTU is received, the start address is saved in the register 208. The decoder 102 supplies the payload followed by the LTU CRC. After storing the words of the payload (either processed or un-processed), the computed LTU CRC field is compared with the received LTU CRC field. In case of a match, the address counter 204 is incremented to point to the next address, which will store the first data payload of the next LTU. The LTU counter 206 counts the number of valid LTUs in the memory 202 and is then incremented. In the case of a mismatch, the LTU counter 206 is not incremented, and the address counter 204 is loaded with the value stored in the register 208 (which contains the start address of the bad LTU). The new LTU payload is stored starting from the loaded address in the address counter 204, so the previously stored invalid LTU is overwritten.

At the end of a particular frame, the memory 202 contains only the good LTUs. The LTU counter 206 presents the number of LTUs stored in the memory 202. In case of using a single port memory 202, control on the memory 202 interface may be switched between a read mode and a write mode, and the data may be read/written from/to the memory 202.

At the beginning of each frame, the counters 204 and 206 are reset. At the beginning of each LTU, the address counter value is stored in the address register 208. Then, the LTU payload (either a processed or un-processed payload) is stored in the memory 202. The address counter 204 is incremented after every word that is stored in the memory 202. After the complete LTU payload is stored in the memory 202, the comparison between the computed LTU CRC and the received LTU CRC is checked. If The LTU CRC words match, the LTU counter 206 is incremented. If the LTU CRC words do not match, the stored start address is loaded into the address counter 204, effectively discarding the bad LTU.

Figure 5:
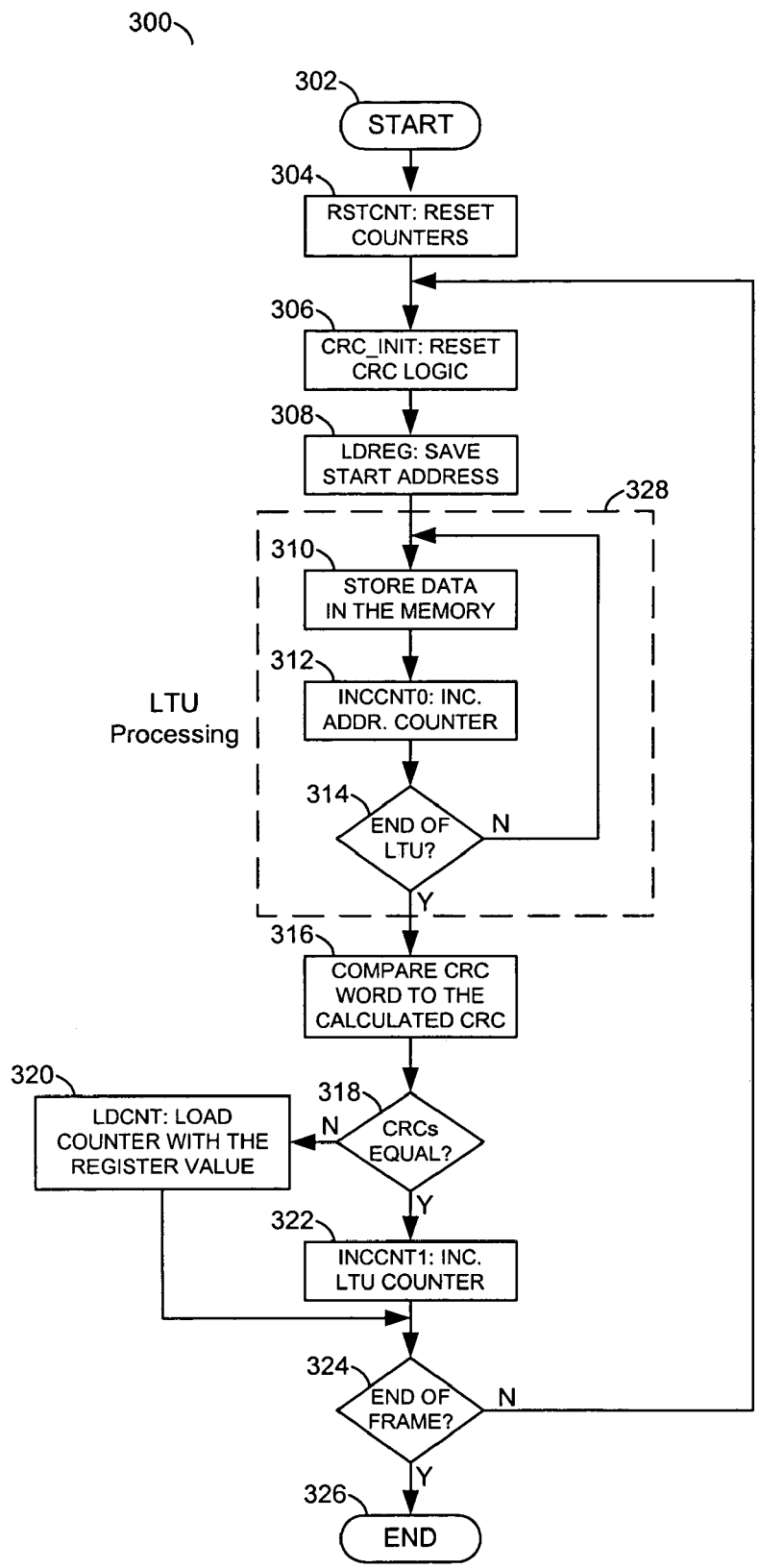
FIG. 5 is a flow diagram of the present invention.

Referring to FIG. 5, a flowchart of a method (or process) 300 is shown. The method 300 generally comprises a start state 302, a state 304, a state 306, a state 308, a state 310, a state 312, a decision state 314, a state 316, a decision state 318, a state 320, a state 322, a decision state 324, and a state 326. The state 302 may be a start state. The state 304 generally presents the signal RSTCNT to reset the counters 204 and 206. The state 306 generally resets the CRC logic by generating the signal CRC_INIT. The state 308 generally presents the signal LDREG configured to save the start address in the address register 208. Next, the state 310 generally stores data in the memory. Next, the state 312 generally presents the signal INCCNT0 to increment the address counter 204. Next, the decision state 314 determines if an end of an LTU is present. If not, the method 300 moves back to the state 310. If so, the method 300 moves to the state 316. The state 310, the state 312, and the decision state 314 may be considered a LTU processing section 328.

Next, the state 316 compares the CRC word to the calculated CRC. Next, the decision state 318 determines if the CRCs are equal. If so, the method 300 moves to the state 322. If not, the method 300 moves to the state 320. The state 320 generates the signal LDCNT that loads the counter 204 with the values stored in the address register 208. The state 322 generates the signal INCCNT1 configured to increment the LTU counter 206. Next, the state 324 determines if an end of frame signal EOF is present. If not, the method 300 moves back to the state 306. If so, the method 300 moves to the state 326. Storing only the valid LTUs reduces the MIPS needed to compute the LTU CRC fields. The processing of a particular payload can may begin earlier than using conventional approaches.

The function performed by the flow diagram of FIG. 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s)

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMs, EPROMS, EEPROMS, Flash memory, magnetic or optical cards, or any type of media suitable for storing electronic instructions.

The various signals of the present invention are generally shown on individual inputs and outputs. In other embodiments, some or all of the various signals may be multiplexed through one or more inputs and/or outputs as desired or needed. The various signals of the present invention may be implemented as single-bit or multi-bit signals in a serial and/or parallel configuration.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

The present invention may be used in portions of a code division multiple access (CDMA) chipset. While the present invention may be useful in CDMA designs, the present invention may be applied to static timing analysis of other designs as well.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a logic circuit configured to generate a check signal in response to a data signal decoded from a series of frames, each of said frames comprising a plurality of logical transmission units (LTUs), each of said LTUs comprising (a) a payload and (b) a field;
   a compare circuit configured to generate a compare signal in response to said check signal and said field corresponding to each of said LTUs in said data signal;
   a control circuit configured to generate a control signal indicating either a valid status or an invalid status of each of said payloads in response to a data valid signal and said compare signal, wherein said control signal indicates said invalid status when said data valid signal indicates a frame error and said compare signal indicates said invalid status; and
   a memory interface configured to generate an output data signal in response to said control signal, wherein said memory interface (i) stores each of said payloads when received and (ii) overwrites at least one of said payloads having said invalid status such that said payloads have a different sequence as stored than as in said frame.

2. The apparatus according to claim 1, wherein said memory interface is further configured to generate a count signal indicating a number of said payloads having said valid status stored in said memory interface.

3. The apparatus according to claim 1, wherein said plurality of said LTUs are configured as service data units (SDUs).

4. The apparatus according to claim 1, further comprising a processing circuit configured to process said payloads prior to storage in said memory interface.

5. The apparatus according to claim 1, wherein said memory interface comprises:
   a memory comprising a plurality of addresses;
   an address counter configured to count a first number of said addresses used;

an LTU counter configured to count a second number of valid LTUs; and an address register configured to store a base address.

6. The apparatus according to claim 1, wherein said logic circuit comprises a cyclical redundancy check (CRC) logic circuit.

7. The apparatus according to claim 1, wherein said logic circuit comprises a finite state machine.

8. The apparatus according to claim 1, wherein said check signal comprises a multi-bit signal and said data valid signal comprises a single-bit signal.

9. The apparatus according to claim 1, wherein said apparatus is implemented in a code division multiple access (CDMA) chipset.

10. The apparatus according to claim 1, wherein said apparatus is implemented in hardware.

11. The apparatus according to claim 1, wherein (i) said check signal comprises a calculated cyclical redundancy check (CRC) data signal and (ii) said field comprises a CRC word.

12. An apparatus comprising:

means for generating a check signal in response to a data signal decoded from a series of frames, each of said frames comprising a plurality of logical transmission units (LTUs), each of said LTUs comprising (a) a payload and (b) a field;

means for generating a compare signal in response to said check signal and said field corresponding to each of said LTUs in said data signal;

means for generating a control signal indicating either a valid status or an invalid status of each of said payloads in response to a data valid signal and said compare signal, wherein said control signal indicates said invalid status when said data valid signal indicates a frame error and said compare signal indicates said invalid status; and means for generating an output data signal in response to said control signal, wherein said output data signal generating means (i) stores each of said Payloads when received and (ii) overwrites at least one of said payloads having said invalid status such that said payloads have a different sequence as stored than as in said frame.

13. The apparatus according to claim 12, wherein (i) said check signal comprises a calculated cyclical redundancy check (CRC) data signal and (ii) said field comprises a CRC word.

14. A method for using hardware to discard bad logical transmission units, comprising the steps of:

(A) generating a check signal in response to a data signal decoded from a series of frames, each of said frames comprising a plurality of logical transmission units (LTUs), each of said LTUs comprising (a) a payload and (b) a field;

(B) generating a compare signal in response to said check signal and said field corresponding to each of said LTUs in said data signal;

(C) generating a control signal indicating either a valid status or an invalid status of each of said payloads in response to a data valid signal and said compare signal, wherein said control signal indicates said invalid status when said data valid signal indicates a frame error and said compare signal indicates said invalid status; and (D) generating an output data signal in response to said control signal by (i) storing each of said payloads when received and (ii) overwriting at least one of said payloads having said invalid status such that said payloads have a different sequence as stored than as in said frame.

15. The method according to claim 14, wherein (i) said check signal comprises a calculated cyclical redundancy check (CRC) data signal and (ii) said field comprises a CRC word.

* * * * *